United States Patent
Lee et al.

(10) Patent No.: US 6,671,045 B1
(45) Date of Patent: Dec. 30, 2003

(54) APPARATUS AND METHOD FOR MEASURING OPTICAL SIGNAL-TO-NOISE RATIO

(75) Inventors: Chang Hee Lee, Taejon (KR); Sang Yung Shin, Seoul (KR); Kwang Uk Chu, Taejon (KR)

(73) Assignee: Korea Advanced Institute of Science & Technology, Taejon (KR)

( * ) Notice: Subject to any disclaimer, the term of this patent is extended or adjusted under 35 U.S.C. 154(b) by 14 days.

(21) Appl. No.: 09/679,822

(22) Filed: Oct. 5, 2000

(30) Foreign Application Priority Data

Oct. 15, 1999 (KR) .............................. 99-44723

(51) Int. Cl.⁷ .......................... G01J 4/00; H04B 10/08; H04B 10/00
(52) U.S. Cl. ..................... 356/364; 359/161; 359/110; 359/124
(58) Field of Search ................. 359/364, 161, 359/110, 124; 356/364

(56) References Cited

U.S. PATENT DOCUMENTS

| 5,107,511 | A | * | 4/1992 | Nakatani et al. | ....... 372/29.021 |
|---|---|---|---|---|---|
| 5,298,972 | A | * | 3/1994 | Heffner | ....................... 356/364 |
| 5,552,919 | A | * | 9/1996 | Majima et al. | .............. 359/110 |
| 5,594,577 | A | * | 1/1997 | Majima et al. | .............. 359/124 |
| 5,956,131 | A | * | 9/1999 | Mamyshev et al. | .... 250/227.18 |
| 5,965,874 | A | * | 10/1999 | Aso et al. | ................... 250/225 |
| 6,380,533 | B1 | * | 4/2002 | Jopson et al. | ............... 250/225 |

* cited by examiner

*Primary Examiner*—Jack Berman
*Assistant Examiner*—K. Fernandez
(74) *Attorney, Agent, or Firm*—Bacon & Thomas, PLLC

(57) ABSTRACT

An apparatus and method for measuring optical signal-to-noise ratio in optical communications includes (1) a variable optical band-pass filter (VOBPF) that passes the amplified output beam when the beam wavelength is the same as the passing wavelength of the VOBPF; (2) a 1×4 beam distributor for distributing the passing beam of the VOBPF into four streams; (3) a measuring device for measuring Stokes parameters S0, S1, S2, S3 from the four distributed beams; (4) a calculating device for calculating the optical signal power by finding the power of the polarized component of the amplified output beam from the Stokes parameters S1, S2, and S3; (5) a calculating device for calculating the noise power by finding the power of the noise included in the amplified output beam from Stokes parameter S0 and the optical signal power; and (6) a dividing device for calculating the ratio $$\frac{\text{Power of Optical Signal}}{\text{Power of Noise}}$$

at the passing wavelength.

10 Claims, 11 Drawing Sheets

(a)

(b)

APPARATUS AND METHOD FOR
MEASURING OPTICAL SIGNAL-TO-NOISE
RATIO

BACKGROUND OF THE INVENTION

1. Field of the Invention

The present invention relates generally to optical communications, and more particularly relates to an apparatus and a method for measuring optical signal-to-noise ratio in optical communications. An optical amplifier is a device to amplify optical signals without photo-electric/electric-photo conversion, and does not depend on the transmission speed or the transmission format of optical signals. A conventional optical transmitter amplifies the signals after photo-electric conversion, and reproduces optical signals with electric-photo conversion. The optical amplifier is substituted for the conventional optical transmitter. In particular, the optical amplifier can simultaneously amplify many optical signals of different wavelengths in a wide band, and the optical amplifier plays an important role in Wavelength Division Multiplexing (WDM) optical communications. In order to increase the transmitting capacity, several channels of optical signals are multiply divided with different wavelengths in WDM

2. Description of the Related Art

The optical amplifier produces not only the amplified optical signals but also the noise of wide wavelength band. Even though optical filters are used to remove the noise included in the output beam of the optical amplifier, the noise of same wavelengths of the signals can not be eliminated. Optical signal-to-noise ratio, the power of the optical signals divided by the power of the corresponding noise, is used as a standard for a transmitting quality of optical communication network. And it is necessary to monitor the optical signal-to-noise ratio at optical lines or at optical nodes for optical communication network management.

FIG. 1 is a power spectrum of the output beam when the optical amplifier amplifies the multiplexed signals without optical filters in WDM optical communications. The spectrum is taken from a conventional spectrum analyzer. As mentioned above, the optical signal-to-noise ratio is the value of the power of the optical signals divided by the power of the corresponding noise. However, the noise can not be measured directly since the noise are detected with the optical signals as shown in FIG. 1.

FIG. 2 is a graph to explain how to measure the optical signal-to-noise ratio of output signals shown in FIG. 1. In order to measure the ratio, first take a power spectrum of the multiplexed signals amplified with the optical amplifier. From the obtained spectrum, find A, the peak power of the Optical Signal 1, and measure a, b, the neighboring noise power. Calculate (a+b)/2, the average noise-power, and assume it as the noise power at the wavelength of the Optical Signal 1. Then, the optical signal-to-noise ratio of the Optical Signal 1 is obtained using EQUATION 1.

$$\text{Optical Signal-to-noise ratio of the Optical Signal 1} = \frac{A - (a+b)/2}{(a+b)/2} \quad \text{[EQUATION 1]}$$

Similarly, the ratio of the Optical Signal 2, and Signal 3 can be obtained.

However, in some cases, it is impossible to measure the optical signal-to-noise ratio with the above method in FIG. 2. FIG. 3 explains these cases, and shows another power spectrum of the output beam when optical filters are used to remove the noise in WDM optical communications. According to the method in FIG. 2, the power (a, b) of noise nearby the peak wavelength should be known in order to measure the optical signal-to-noise ratio. In cases of FIG. 3, the method in FIG. 2 can not be used since the noise is not easily distinguishable from the optical signals.

FIG. 4 is a block diagram to solve the problems, and shows a device to measure the optical signal-to-noise ratio using a polarization controller and a linear polarizer (LP). The optical signal-to-noise ratio in FIG. 3 can be measured with the instruments in FIG. 4. The device (400) for measuring the optical signal-to-noise ratio shown in FIG. 4 is published in '98 European Conference on Optical Communication, p. 549–550, 1998' with the title of "Optical Signal-to-Noise Ratio Measurement in WDM Networks Using Polarization Extinction" by M. Rasztovits-Wiech, M. Danner, and W. R. Leeb.

In optical communications, laser diodes are generally used as a light source. The polarization state of the output beam from a laser diode is 100% linearly polarized, and the optical signals are still 100% polarized even though the polarization state is changed as the signals traveling the optical fiber. On the other hand, the noise from an optical amplifier is 100% unpolarized since the noise consists of the randomly occurred lights of all polarization states.

Therefore, the power of the interested noise can be measured when the amplified optical signals are eliminated using a polarization controller (401) and a LP (402). The polarization controller controls the polarization of the input beam, and the LP passes only the component of the light coincide with the polarization axis. The 100% polarized optical signals can be completely eliminated; the polarization controller (401) can control the polarization state of the optical signals even after the signals traveled the optical fiber, and the controller changes the polarization of the optical signals orthogonal to the polarization axis of the LP (402). However, the power of the noise passing through a LP (402) always reduces to the half since the noise consists of the lights of all polarization states.

Referring FIG. 4, the output beam (shown in FIG. 1) of the optical amplifier is inputted into the polarization controller (401). Adjust the polarization controller to maximize the power of the optical signals passing through the LP (402) and the variable optical band-pass filter, VOBPF (403) at the photo detector (404), and measure the maximum value. Then, readjust the polarization controller to minimize the power at the photo detector (404), and measure the minimum value. Repeat the process for the full spectrum range by changing the passing wavelength of the VOBPF (403).

FIG. 5(a) is a spectrum of the output beam in FIG. 1 when the power at the photo detector (404) in FIG. 4 is maximized, and FIG. 5(b) is another spectrum when the power is minimized. In FIG. 5(a), the peak power is the sum of the power, D, of the optical signals and the half, d, of the noise power, while the power in FIG. 5(b) is the half of the original noise. Then, the optical signal-to-noise ratio of the Optical Signal 1 is obtained using EQUATION 2.

$$\text{Optical Signal-to-noise ratio of the Optical Signal 1} = \frac{D - d}{2 \times d} \quad \text{[EQUATION 2]}$$

Similarly, the ratio of the Optical Signal 2, and Signal 3 can be obtained.

FIG. 6(a) is a spectrum of the output beam in FIG. 3 when the power at the photo detector (404) in FIG. 4 is maximized, and FIG. 6(b) is another spectrum when the power is minimized. In FIG. 6(a), the peak power is the sum of the power, E, of the optical signals and the half, e, of the noise power, while the power in FIG. 6(b) is the half of the original noise. Therefore, the optical signal-to-noise ratio of the Optical Signal 1 is obtained using EQUATION 3.

$$\text{Optical Signal-to-noise ratio} = \frac{E - e}{2 \times e} \qquad \text{[EQUATION 3]}$$
of the Optical Signal 1

Similarly, the ratio of the Optical Signal 2, and Signal 3 can be obtained.

However, the preceding method shown in FIG. 4 needs to adjusts the polarization controller (401) to find the maximum and the minimum of the optical power at the photo detector (404) for each given wavelength. And the method has two major problems; (1) long operation time to measure the optical signal-to-noise ratio, and (2) a complicated active control circuit to handle the polarization controller (401).

SUMMARY OF THE INVENTION

It is an object of the present invention to provide an apparatus and a method for measuring the optical signal-to-noise ratio using Stokes parameters in optical communications. The present invention can solve the above mentioned problems.

In accordance with an aspect of the present invention there are provided an apparatus and a method for measuring the optical signal-to-noise ratio in optical communications. The apparatus according to the invention comprises (1) a VOBPF passing the amplified output beam when the beam wavelength is same as the passing wavelength of the VOBPF; (2) a 1×4 beam distributor distributing the passing beam of the VOBPF into four streams; (3) a measuring means of Stokes parameters S0, S1, S2, S3 from the four distributed beams; (4) a calculating means of the optical signal power finding the power of the polarized component of the amplified output beam from the Stokes parameters S1, S2, S3; (5) a calculating means of the noise power finding the power of the noise included in the amplified output beam from Stokes parameter S0 and the optical signal power; and (6) a dividing means calculating the $$\frac{\text{Power of Optical Signal}}{\text{Power of Noise}}$$

of the passing wavelength from the optical signal power and the noise power. The apparatus according to the invention measures the $$\frac{\text{Power of Optical Signal}}{\text{Power of Noise}}$$

for the whole spectrum range by changing the passing wavelength of the VOBPF, and eventually find the optical signal-to-noise ratio of an optical signal by searching the peak from the measured $$\frac{\text{Power of Optical Signal}}{\text{Power of Noise}}$$

graph.

In a preferred apparatus, the measuring means of Stokes parameters S0, S1, S2, S3 further comprises (1) 0° linear polarization means detecting the power of 0° linear polarization component (PX) from the first distributed beam; (2) 90° linear polarization means detecting the power of 90° linear polarization component (PY) from the second distributed beam; (3) 45° linear polarization means detecting the power of 45° linear polarization component (P45) from the third distributed beam; (4) circular polarization means detecting the power of right-hand circular polarization component (PRCP) from the forth distributed beam; and (5) a Stokes parameter calculating means finding Stokes parameters S0, S1, S2, S3 from the measured power PX, PY, P45, PRCP In a more preferred apparatus, the circular polarization means further comprises (1) a λ/4 retarder making the phase difference between the two orthogonal beams with 0° and 90° linear polarization become λ/4 by retarding the phase of the input beam, and (2) a 45° LP passing only the 45° linear polarization component after the λ/4 retarder.

In another more preferred apparatus, the Stokes parameter calculating means further comprises (1) a first adder finding Stokes parameter S0 by adding the power PX and PY; (2) a second adder finding Stokes parameter S1 by subtracting the power PY from PX; (3) a first multiplier multiplying the power P45 by 2; (4) a third adder finding Stokes parameter S2 by subtracting Stokes parameter S0 from the output of the first multiplier, 2P45; (5) a second multiplier multiplying the power PRCP by 2; and (6) a fourth adder finding Stokes parameter S3 by subtracting Stokes parameter S0 from the output of the second multiplier, 2PRCP.

In another preferred apparatus, the VOBPF can be embodied with a Fabry-Perot variable filter, an integrated optic device with lattices, or a multi-layered thin film.

A method for measuring the optical signal-to-noise ratio in optical communications according to the invention comprises following 8 steps. (1) A first step where the amplified output beam passes through the VOBPF with the starting wavelength; (2) a second step where the passing beam of the first step is distributed into four streams; (3) a third step where obtain Stokes parameters S0, S1, S2, S3 from the four distributed beams; (4) a fourth step where find the optical signal power by calculating the power of the polarized component of the amplified output beam from the Stokes parameters S1, S2, S3; (5) a fifth step where find the power of the noise included in the amplified output beam from Stokes parameter S0 and the optical signal power; (6) a sixth step where calculate $$\frac{\text{Power of Optical Signal}}{\text{Power of Noise}}$$

of the passing wavelength from the optical signal power and the noise power; (7) a seventh step where measure $$\frac{\text{Power of Optical Signal}}{\text{Power of Noise}}$$

for the whole spectrum range by repeating the process from the second step to the sixth step for the each passing wavelength of the VOBPF; and (8) a eighth step where find the optical signal-to-noise ratio of an optical signal by searching the peak from the measured $$\frac{\text{Power of Optical Signal}}{\text{Power of Noise}}$$

graph.

In a preferred method, the third step further comprises (1) a first sub-step where detect the power PX, PY, P45, PRCP; and (2) a second sub-step where calculate Stokes parameters S0, S1, S2, S3 from the measured power PX, PY, P45, PRCP.

In a more preferred method, the second sub-step further comprises following four steps. (1) Finding Stokes parameter S0 by adding the power PX and PY; (2) finding Stokes parameter S1 by subtracting the power PY from PX; (3) finding Stokes parameter S2 by subtracting Stokes parameter S0 from 2P45; and (4) finding Stokes parameter S3 by subtracting Stokes parameter S0 from 2PRCP.

BRIEF DESCRIPTION OF THE DRAWINGS

Exemplary embodiments of the present invention will be described in conjunction with the drawings in which:

FIG. 5($b$) is another spectrum of the output beam in FIG. 1 when the power at the photo detector (404) in FIG. 4 is minimized;

FIG. 6($b$) is another spectrum of the output beam in FIG. 3 when the power at the photo detector (404) in FIG. 4 is minimized;

FIG. 9($b$) shows the wavelength dependence of the noise power in addition to Stokes parameter S0;

FIG. 10($b$) shows the wavelength dependence of the $$\frac{\text{Power of Polarized beam}}{\text{Power of noise}};$$

and

Figure 11:
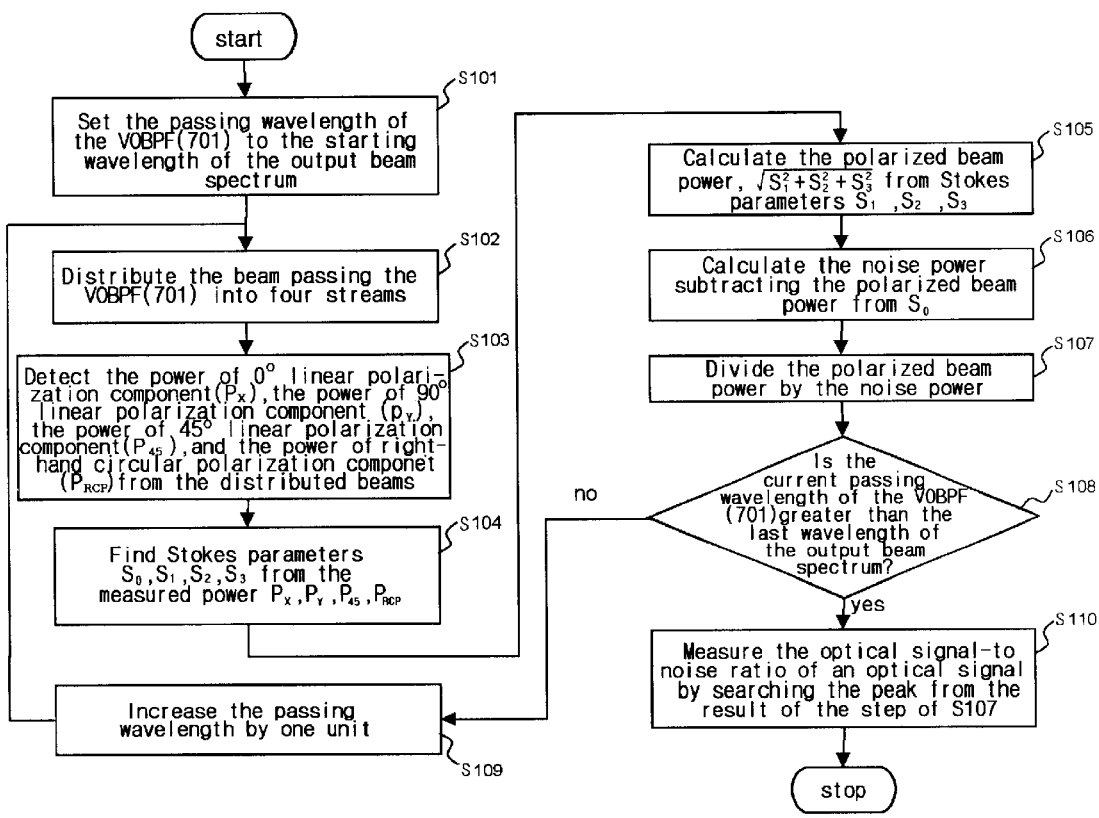

FIG. 11 is a flow chart of the method for measuring the optical signal-to-noise ratio according to the present invention.

EXPLANATIONS FOR MAIN SYMBOLS IN THE DRAWINGS

700: Block diagram of the apparatus for measuring optical signal-to-noise ratio
701: Variable Optical Band-Pass Filter (VOBPF)
702: 1×4 Beam Distributor
703: 0° Linear Polarizer (LP)
704: 90° LP
705, 707: 45° LP
706: λ/4 Retarder
708, 709, 710, 711: Photo Detector
713, 714, 716, 718, 720: Adder
715, 717: Multiplier
719: Signal Processor
721: Divider

DETAILED DESCRIPTION OF THE EMBODIMENTS

The present invention will be better understood with regard to the following description, appended claims, and accompanying figures.

Figure 7:
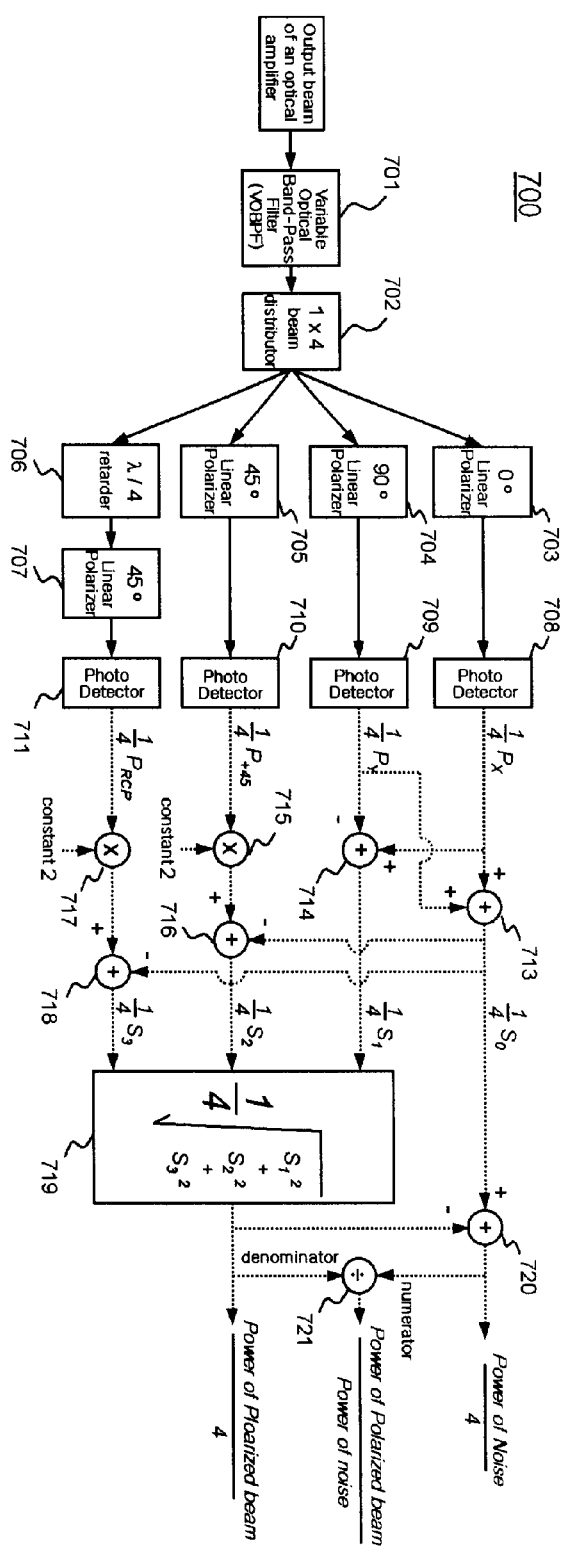
FIG. 7 is a block diagram of the apparatus (700) for measuring optical signal-to-noise ratio according to the present invention.

FIG. 7 is a block diagram of the apparatus (700) for measuring optical signal-to-noise ratio according to the present invention. The apparatus of the invention composes a VOBPF (701), an 1×4 beam distributor(702), 4 linear polarizers (703, 704, 705, 707), λ/4 retarder (706), 4 photo detectors (708, 709, 710, 711), 5 adders (713, 714, 716, 718, 720), 2 multipliers (715, 717), a signal processor (719), and a divider (721).

The VOBPF (701) passes the amplified output beam whose wavelength is same as the selected passing wavelength of the VOBPF. The 1×4 beam distributor (702) distributes the passing beam of the VOBPF into four streams, and the distributed beams are guided into the 0°, 90°, 45° LP (703, 704, 705), and the λ/4 retarder (706). The 0° LP (703) passes only the 0° linear polarization beam, the 90° LP (704) passes only the 90° linear polarization beam, and the 45° LP (705) passes only the 45° linear polarization beam. Only the beam of right-hand circular polarization passes through λ/4 retarder (706) and 45° LP (707). The photo detectors (708, 709, 710, 711) measure the power, (PX/4, PY/4, P45/4, PRCP/4) of the corresponding polarization components. The Stokes parameters S0/4, S1/4, S2/4, S3/4 can be calculated from the measured the power (PX/4, PY/4, P45/4, PRCP/4) with the adders (713, 714, 716, 718) and the multipliers (715, 717).

With the calculated Stokes parameters (S1/4, S2/4, S3/4) the signal processor (719) produces $$\frac{\sqrt{S_1^2 + S_2^2 + S_3^2}}{4},$$

$$\frac{\text{Power of Polarized beam}}{4}.$$

In other words, the signal processor (719) gives the $$\frac{\text{Power of Optical Signal}}{4}.$$

The $$\frac{\text{Power of Noise}}{4}$$

is obtained from the Stokes Parameter S0 and $$\frac{\text{Power of Optical Signal}}{4}$$

by the adder (720), and the divider (721) finally gives the $$\frac{\text{Power of Optical Signal}}{\text{Power of Noise}}.$$

The Stokes parameters S0, S1, S2, S3 are defined as follow:
S0=Sum of the polarized beam power and the unpolarized beam power,
S1=PX (Power of 0° linear polarization component)−PY (Power of 90° linear polarization component),
S2=P45 (Power of +45° linear polarization component)−P−45 (Power of −45° linear polarization component),
S3=PRCP (Power of right-hand circular polarization component)−PLCP (Power of left-hand circular polarization component).

Since each of (0° linear polarization and 90° linear polarization), (+45° linear polarization and −45° linear polarization), and (right-hand circular polarization and left-hand circular polarization) is a complete orthogonal set, the following equations hold:
[EQUATION 3]

$$S0=PX+PY=P45+P-45=PRCP+PLCP$$

$$S1=PX-PY=PX-(S0-PX)=2PX-S0$$

$$S2=P45-P-45=P45-(S0-P45)=2P45-S0$$

$$S3=PRCP-PLCP=PRCP-(S0-PRCP)=2PRCP-S0$$

The optical signals are 100% polarized, and the noise from the amplifier is 100% unpolarized. Therefore, the optical signal-to-noise ratio can be obtained using EQUATION 4:
[EQUATION 4]

Power of Optical Signal=Power of the polarized component= $\sqrt{S_1^2+S_2^2+S_3^2}$ Power of Noise=Power of the unpolarized beam=Total Power−Power of Optical Signal=$S0-\sqrt{S_1^2+S_2^2+S_3^2}$ $$\therefore \text{signal-to-noise ratio} = \frac{\text{Power of Optical Signal}}{\text{Power of Noise}}$$

$$= \frac{\sqrt{S_1^2+S_2^2+S_3^2}}{S_0-\sqrt{S_1^2+S_2^2+S_3^2}}$$

This process to find the power of the optical signal from Stokes parameters can be found in "Principles of Optics Electromagnetic Theory of Propagation, Interference and Diffraction of Light" by Max Born and Emil Wolf, 6th Ed., PERGAMON PRESS, pp. 554–555 and in Hewlett Packard Product Note 8509-1, "Polarization Measurement of Signals and Components", pp 5.

Now the apparatus of the invention has the following functions. First, set the passing wavelength of the VOBPF (701) to the starting wavelength of the output beam spectrum. Then, only the beam whose wavelength is same as the passing wavelength of the VOBPF passes through the VOBPF (701), and reaches to the 1×4 beam distributor (702). The passing beam is distributed into four streams by the 1×4 beam distributor (702), and the distributed beams are guided to 0° LP (703), 90° LP (704), 45° LP (705), and λ/4 retarder (706).

Only the 0° linear polarization component passes through the 0° LP (703), and reaches to the photo detector (708). Thus, the output value of the photo detector (708) is PX/4 of the output beam passing the VOBPF (701). Similarly, the output value of the photo detector of 709 and 710 are PY/4 and P45/4 of the output beam passing the VOBPF (701), respectively.

The λ/4 retarder (706) retards the phase of 90° linear polarization component, and makes the phase difference with 0° linear polarization component become λ/4. Therefore, the right-hand circular polarization component is changed into the 45° linear polarization component at the λ/4 retarder (706), and guided to the 45° LP (707). Accordingly, only the right-hand circular polarization component passes through the λ/4 retarder (706) and 45° LP (707), and reaches to the photo detector (711). Thus, output value of the photo detector (711) is PRCP/4 of the output beam passing the VOBPF (701).

S0/4 is obtained by the adder (713) adding the PX and the PY. S1/4 is obtained by the adder (714) subtracting the PY from the PX. S2/4 is obtained by the multiplier (715) multiplying 2 with the P45/4, and by the adder (716) subtracting the S0/4 from the P45/2. S3/4 is obtained by the multiplier (717) multiplying 2 with the PRCP/4, and by the adder (718) subtracting the S0/4 from the PRCP/2.

The signal processor (719) produce the $$\frac{\text{Power of Polarized beam}}{4}$$

from the calculated Stokes parameters (S1/4, S2/4, S3/4). The Power of Polarized Beam (i.e., Power of Optical Signal) is $\sqrt{S_1^2+S_2^2+S_3^2}$ as in EQUATION 4. The $$\frac{\text{Power of Noise}}{4}$$

is obtained by the adder (720) subtracting the $$\frac{\text{Power of Polarized beam}}{4}$$

from the S0/4. Thus, the Power of Noise is $S_0-\sqrt{S_1^2+S_2^2+S_3^2}$ as in EQUATION 4. Finally, the $$\frac{\text{Power of Optical Signal}}{\text{Power of Noise}}$$

is obtained by the divider (721) dividing the $$\frac{\text{Power of Optical Signal}}{4}$$

by the $$\frac{\text{Power of Noise}}{4}.$$

Repeat the process to find the optical signal-to-noise ratio $$\left(= \frac{\text{Power of Optical Signal}}{\text{Power of Noise}}\right)$$

increasing the passing wavelength of the VOBPF (701) by one unit for each step until the passing wavelength becomes the last wavelength for the spectrum. And find the optical signal-to-noise ratio of an optical signal in WDM optical communications by searching the peak from the measured $$\frac{\text{Power of Optical Signal}}{\text{Power of Noise}}$$

graph.

Figure 8:
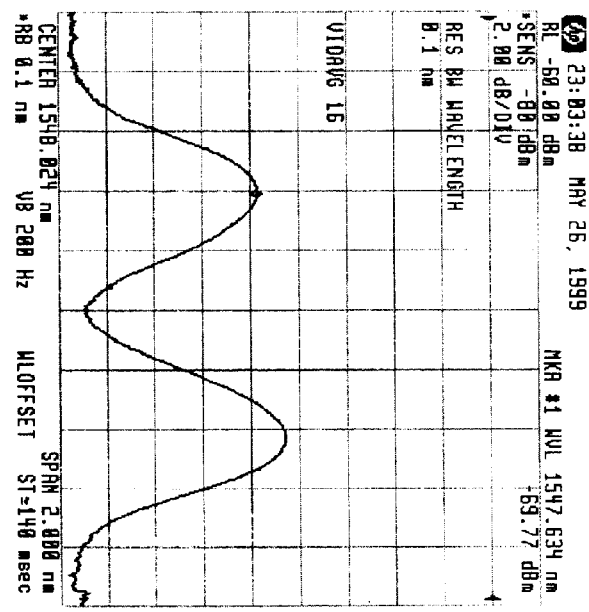
FIG. 8($a$) and ($b$) show power spectra of the amplified output beam when optical filters are used in WDM optical communications, taken from a conventional spectrum analyzer.
Figure 8:
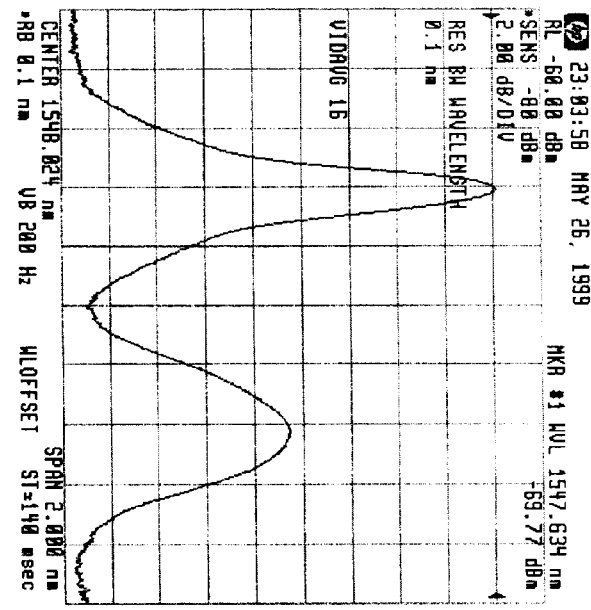

FIG. 8(*a*) and (*b*) show power spectra of the amplified output beam when optical filters are used in WDM optical communications, taken from a conventional spectrum analyzer. In FIG. 8(*a*), there are no optical signals, and only the noise from the amplifier passes through optical filters. This kind of spectrum shows up when the background noise passes through optical filters. On the other hand, in FIG. 8(*b*), there are optical signals whose wavelength peak position coincides with the left broad peak of the passing curve for the optical filters. The optical signal power is 9.66 times greater than the corresponding noise power, and the optical signal-to-noise ratio in this case is 9.85 dB (=10 log 10 9.66).

Figure 9:
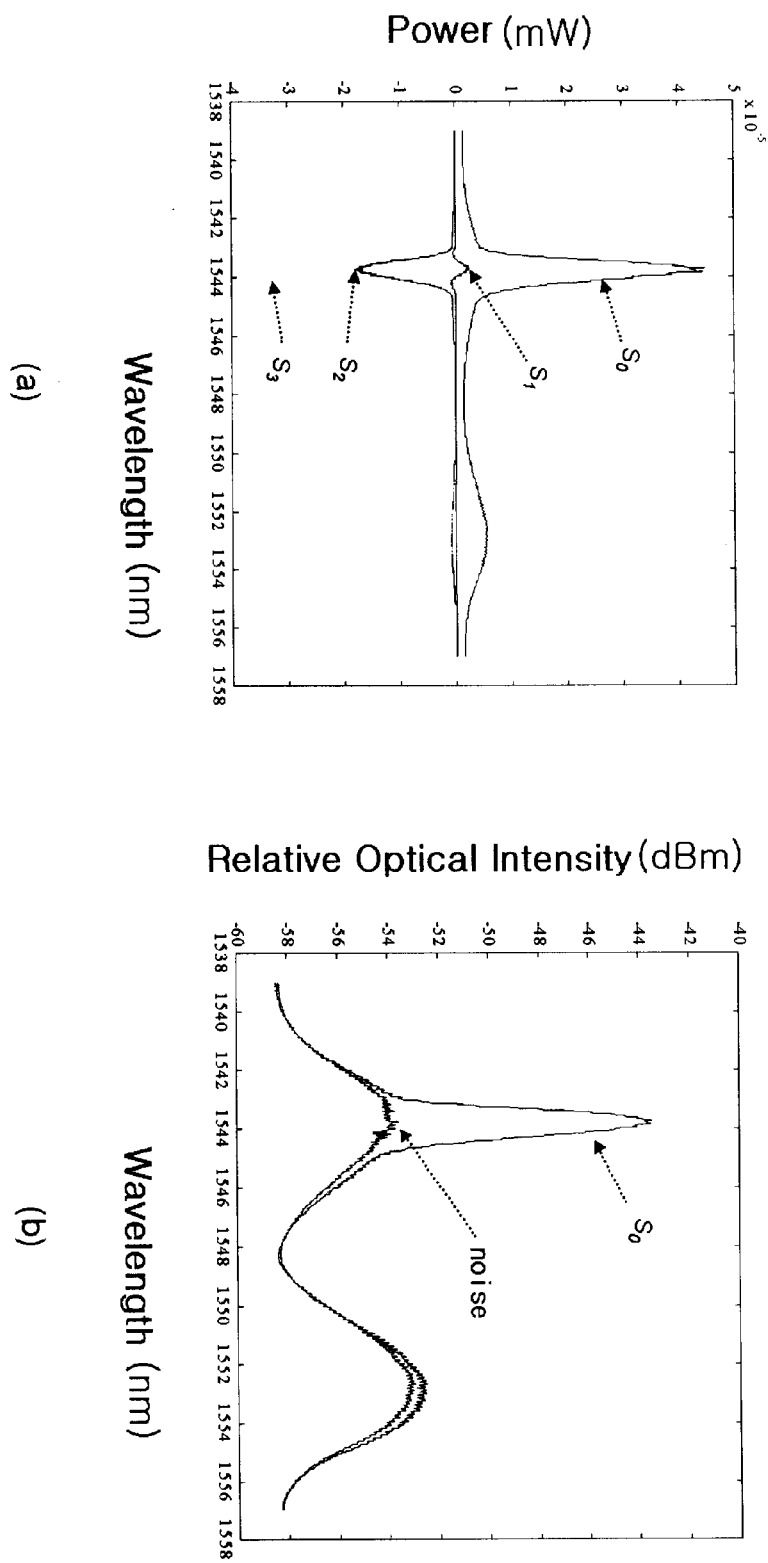
FIG. 9($a$) shows the wavelength dependence of the measured Stokes parameters S0, S1, S2, S3 when the output beam of FIG. 8($b$) is inputted into the VOBPF (701) in FIG. 7.

FIG. 9(*a*) shows the wavelength dependence of the measured Stokes parameters S0, S1, S2, S3 when the output beam of FIG. 8(*b*) is inputted into the VOBPF (701) in FIG. 7. And FIG. 9(*b*) shows the wavelength dependence of the noise power in addition to Stokes parameter S0.

Figure 10:
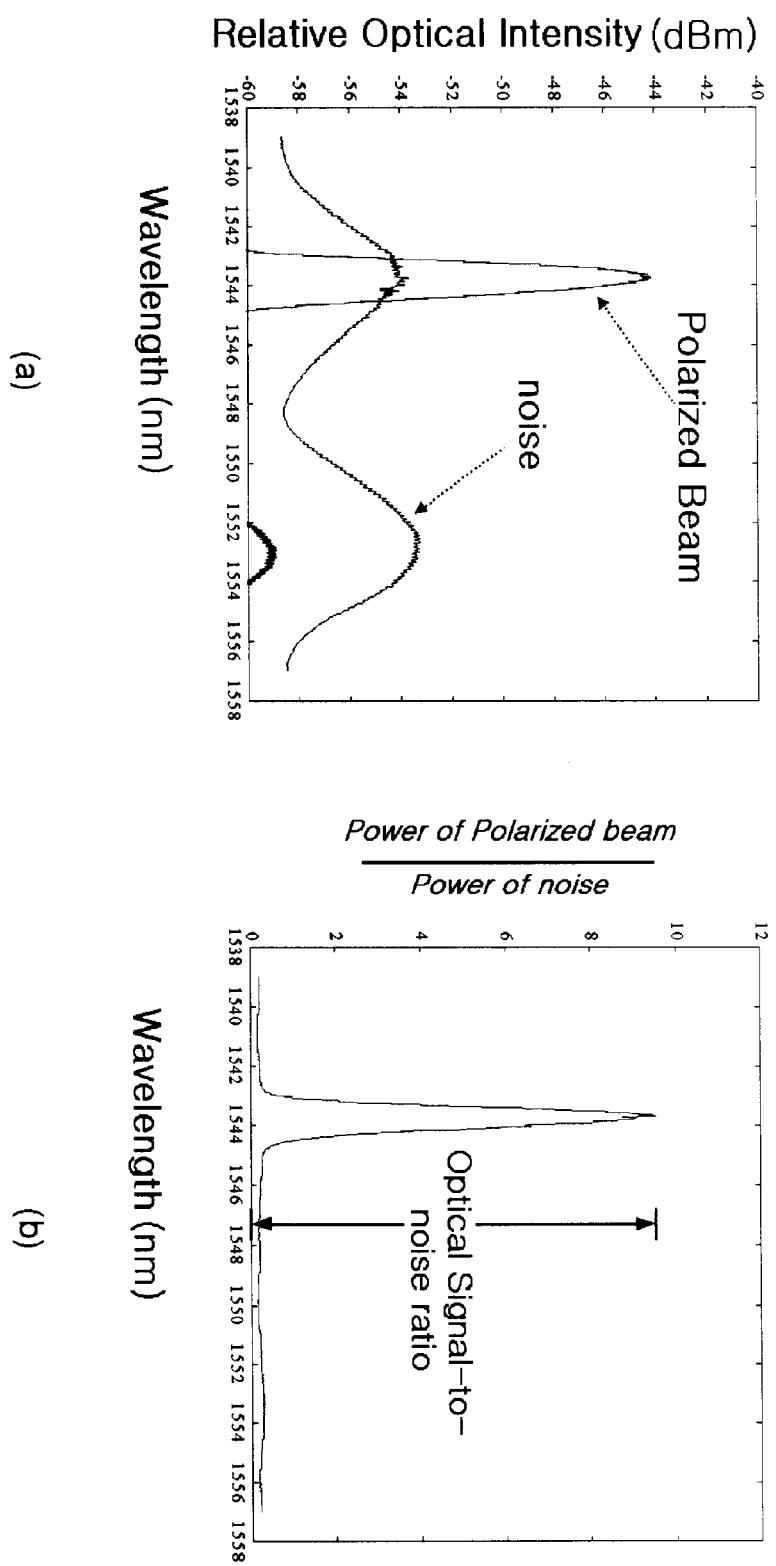
FIG. 10($a$) shows the wavelength dependence of the polarized beam power and the noise power.

FIG. 10(*a*) shows the wavelength dependence of the polarized beam power and the noise power, and FIG. 10(*b*) shows the wavelength dependence of the $$\frac{\text{Power of Polarized beam}}{\text{Power of noise}}.$$

As shown in FIG. 10(*b*), the peak value is about 10 dB, and it coincides with the value (9.85 dB) at FIG. 8(*b*).

Figure 1:
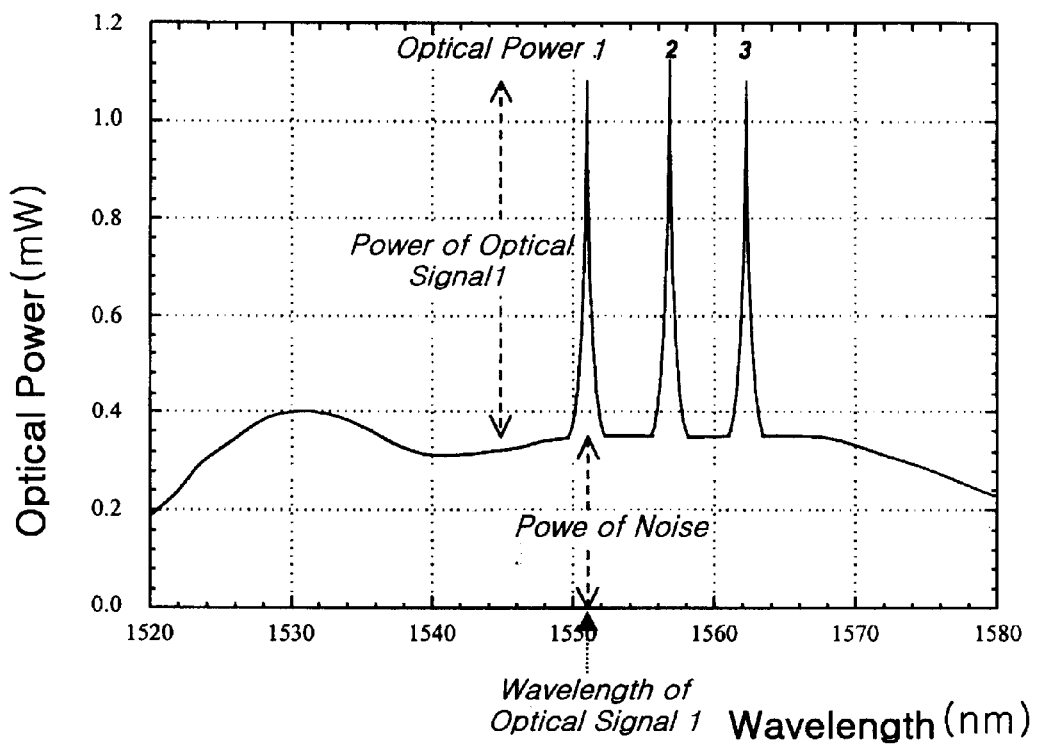
FIG. 1 is a power spectrum of the output beam when the optical amplifier amplifies the multiplexed signals without optical filters in WDM optical communications, taken from a conventional spectrum analyzer.
Figure 2:
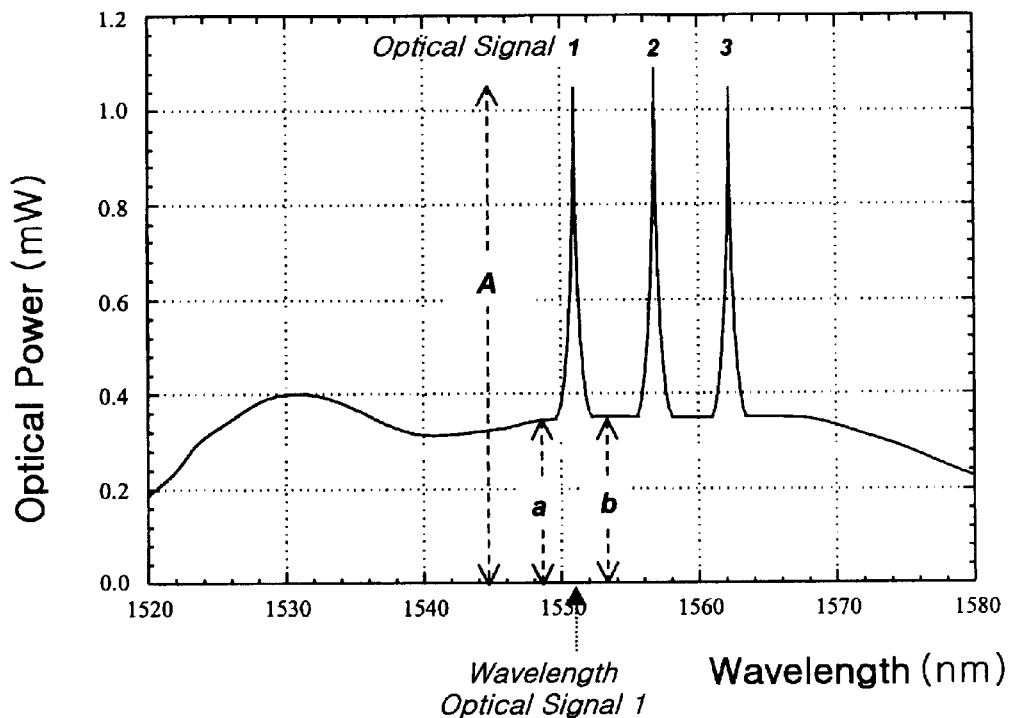
FIG. 2 is a graph to explain how to measure the optical signal-to-noise ratio of output signals shown in FIG. 1.
Figure 3:
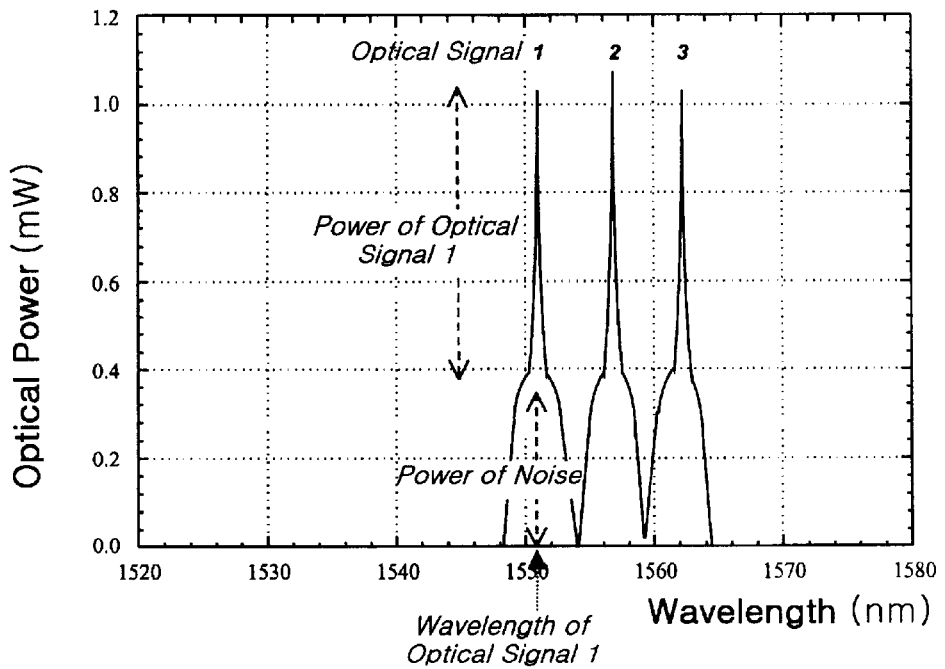
FIG. 3 is another power spectrum of the output beam when optical filters are used to remove the noise in WDM optical communications.
Figure 4:
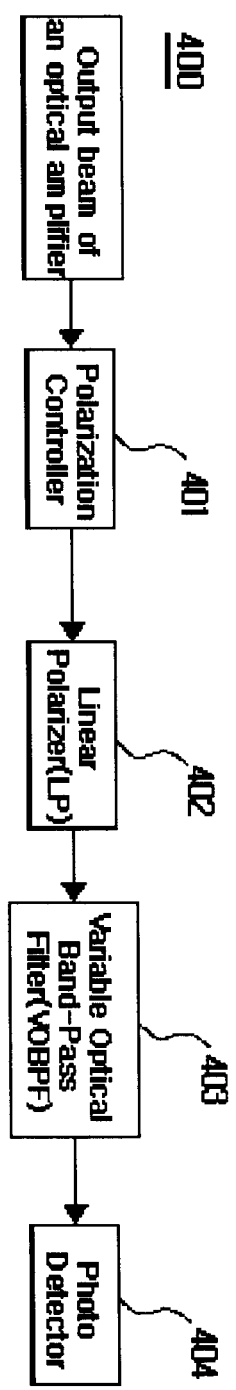
FIG. 4 is a block diagram to show a conventional device to measure the optical signal-to-noise ratio using a polarization controller and a linear polarizer.
Figure 5:
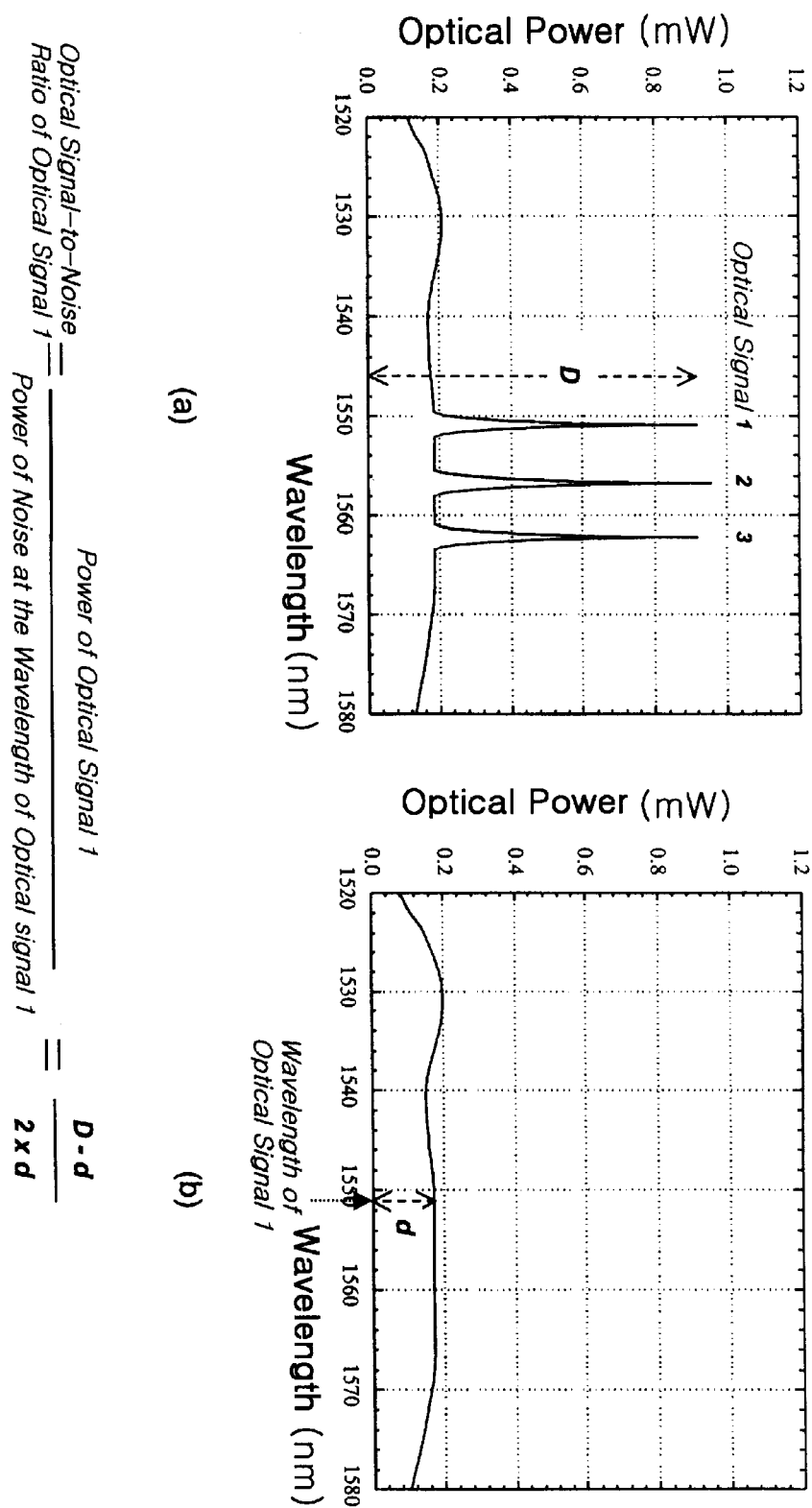
FIG. 5($a$) is a spectrum of the output beam in FIG. 1 when the power at the photo detector (404) in FIG. 4 is maximized.
Figure 6:
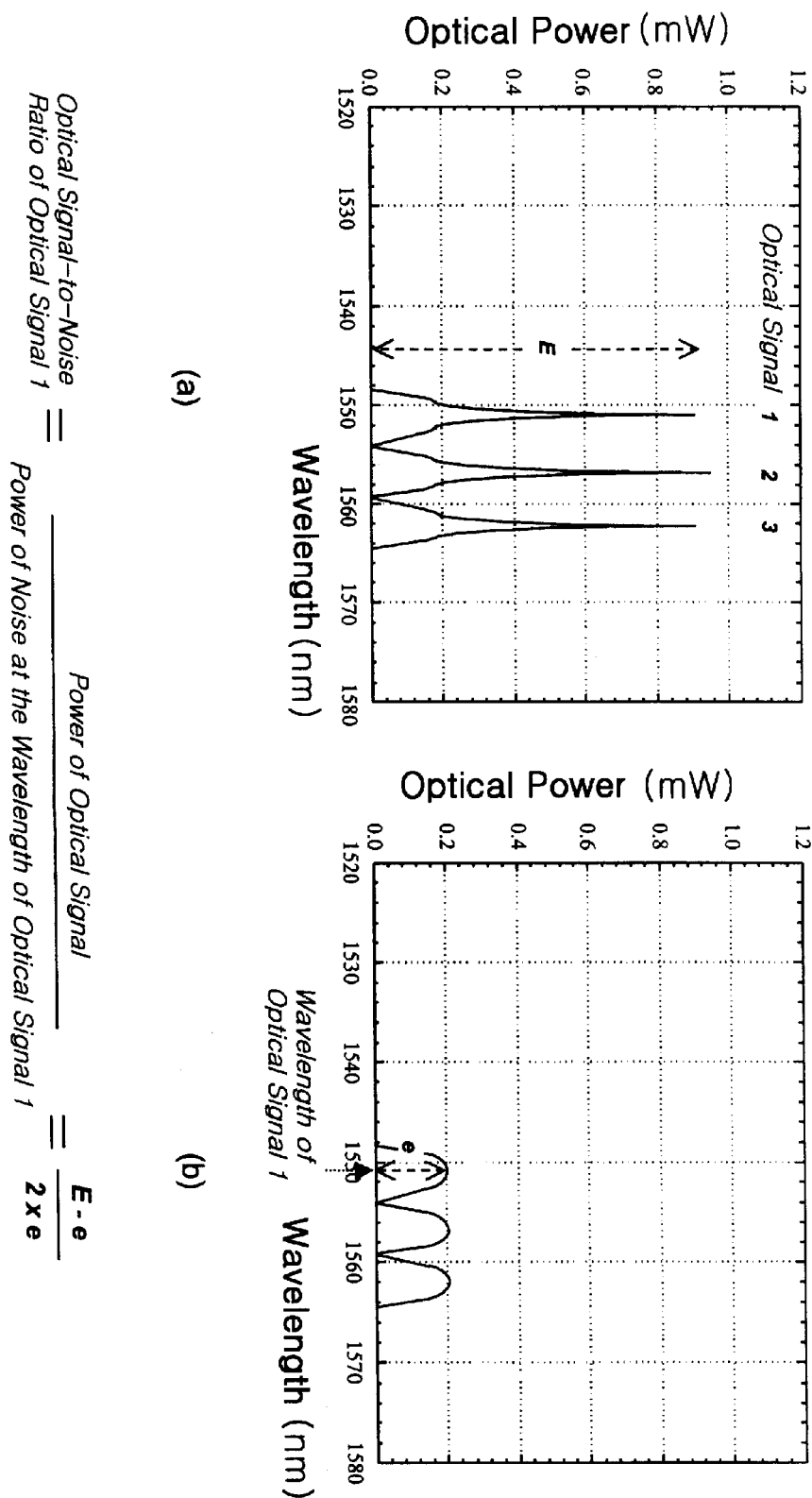
FIG. 6($a$) is a spectrum of the output beam in FIG. 3 when the power at the photo detector (404) in FIG. 4 is maximized.

Obviously, the above mentioned procedure can be applied in order to measure the optical signal-to-noise ratio for the output beam of FIG. 1, where the optical amplifier amplifies the multiplexed signals without optical filters in WDM optical communications.

FIG. 11 a is flow chart of the method for measuring the optical signal-to-noise ratio according to the present invention. First, set the passing wavelength of the VOBPF (701) to the starting wavelength of the output beam spectrum (S101). Distribute the beam passing the VOBPF (701) into four streams (S102). Detect the power PX, PY, P45, PRCP from the distributed beam (S103). Find Stokes parameters S0, S1, S2, S3 from the measured power PX, PY, P45, PRCP (S104). Calculate the polarized beam power, $\sqrt{S_1^2+S_2^2+S_3^2}$ from Stokes parameters S1, S2, S3 (S105). Calculate the noise power subtracting the polarized beam power from S0 (S106). Divide the polarized beam power by the noise power (S107). Compare the current passing wavelength of the VOBPF (701) and the last wavelength of the output beam spectrum (S108). If the current passing wavelength of the VOBPF (701) is not greater than the last wavelength of the spectrum, increase the passing wavelength by one unit (S109), and go to the step of S102. If the current passing wavelength of the VOBPF (701) is greater than the last wavelength of the spectrum, measure the optical signal-to-noise ratio of an optical signal by searching the peak from the results of the step of S107 (S101). This peak value is the desired optical signal-to-noise ratio.

The apparatus according to the present invention produces the following effects: First, since we measure the optical signal-to-noise ratio using Stokes parameters of the output beam without the polarization controller and the complicated active circuit to handle the controller, we can quickly measure the optical signal-to-noise ratio. Second, we can measure the optical signal-to-noise ratio more accurately with a simple hardware.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An apparatus for measuring an optical signal-to-noise ratio in optical communications, comprising:

a variable optical band-pass filter (VOBPF) that passes an amplified output beam when the beam has a same wavelength as a passing wavelength of the VOBPF;

a 1×4 beam distributor for distributing the beam that has passed through the VOBPF into four streams;

a measuring means for measuring Stokes parameters S0, S1, S2, and S3 from the four distributed beams;

a calculating means for calculating an optical signal power by finding a power of a polarized component of the amplified output beam from the Stokes parameters S1, S2, and S3;

a calculating means for calculating a noise power by finding a power of noise included in the amplified output beam from Stokes parameter S0 and the optical signal power; and a dividing means for calculating $$\frac{\text{Power of Optical Signal}}{\text{Power of Noise}}$$

of the amplified output beam passed by the VOBPF from the optical signal power and the noise power.

2. An apparatus as defined in claim 1 wherein the measuring means for measuring Stokes parameters S0, S1, S2, and S3 further comprises:

a 0° lineal polarization means for detecting the power of 0° linear polarization component (PX) from the first distributed beam;

a 90° linear polarization means for detecting the power of 90° linear polarization component (PY) from the second distributed beam;

a 45° linear polarization means for detecting the power of 45° linear polarization component (P45) from the third distributed beam;

a circular polarization means for detecting the power of right-hand circular polarization component (PRCP) from the fourth distributed beam; and a Stokes parameter calculating means for finding Stokes parameters S0, S1, S2, S3 from the measured powers PX, PY, P45, and PRCP.

3. An apparatus as defined in claim 2 wherein the circular polarization means further comprises:

a λ/4 retarder for causing a phase difference between the two orthogonal beams with 0° and 90° linear polarization to become λ/4 by retarding the phase of the input beam; and a 45° linear polarizer for passing only the 45° linear polarization component after the λ/4 retarder.

4. An apparatus as defined in claim 2 or claim 3 wherein the Stokes parameter calculating means further comprises:

a first adder for finding Stokes parameter S0 by adding the powers PX and PY;

a second adder for finding Stokes parameter S1 by subtracting the power PY from the power PX;

a first multiplier for multiplying the power P45 by 2;

a third adder for finding Stokes parameter S2 by subtracting Stokes parameter S0 from the output of the first multiplier, 2P45;

a second multiplier for multiplying the power PRCP by 2; and a fourth adder for finding Stokes parameter S3 by subtracting Stokes parameter S0 from the output of the second multiplier, 2PRCP.

5. An apparatus as defined in claim 1 wherein the VOBPF is a Fabry-Perot variable filter.

6. An apparatus as defined in claim 1 wherein the VOBPF is an integrated optic device with lattices.

7. An apparatus as defined in claim 1 wherein the VOBPF is a multi-layered thin film.

8. A method for measuring an optical signal-to-noise ratio in optical communications comprising the steps of:

a. passing the amplified output beam through a variable optical band-pass filter (VOBPF) with a starting wavelength;

b. distributing the amplified output beam that has passed through the VOBPF into four streams;

c. obtaining Stokes parameters S0, S1, S2, and S3 from the foul distributed beams;

d. finding an optical signal power by calculating a power of a polarized component of the amplified output beam from the Stokes parameters S1, S2, and S3;

e. finding a power of noise included in the amplified output beam from Stokes parameter S0 and the optical signal power;

f. calculating $$\frac{\text{Power of Optical Signal}}{\text{Power of Noise}}$$

of the passing wavelength from the optical signal power and the noise power;

g. measuring $$\frac{\text{Power of Optical Signal}}{\text{Power of Noise}}$$

for the whole spectrum range by repeating the process from step b to step f for each passing wavelength of the VOBPF; and h. finding the optical signal-to-noise ratio of an optical signal by searching a peak from a measured $$\frac{\text{Power of Optical Signal}}{\text{Power of Noise}}$$

graph.

9. A method as defined in claim 8 wherein step c further comprises the sub-steps of:

a1. detecting the power of 0° linear polarization component (PX), the power of 90° linear polarization component (PY), the power of 45° linear polarization component (P45), and the power of right-hand circular polarization component (PRCP); and a2. calculating Stokes parameters S0, S1, S2, and S3 from the measured powers PX, PY, P45, and PRCP.

10. A method as defined in claim 9 wherein substep a2 further comprises the steps of:

finding Stokes parameter S0 by adding the powers PX and PY;

finding Stokes parameter S1 by subtracting the power PY from the power PX;

finding stokes parameter S2 by subtracting Stokes parameter S0 from 2P45; and finding Stokes parameter S3 by subtracting Stokes parameter S0 from 2PRCP.

* * * * *